(12) United States Patent
Keister et al.

(10) Patent No.: US 12,083,913 B2
(45) Date of Patent: *Sep. 10, 2024

(54) SYSTEMS, APPARATUS AND METHODS FOR ELECTRIC VEHICLE CHARGING VIA A POWER CONVERSION SYSTEM

(71) Applicant: Resilient Power Systems, Inc., Athens, GA (US)

(72) Inventors: Josh Keister, Atlanta, GA (US); Lyle T. Keister, Athens, GA (US); Mehdi Abolhassani, Houston, TX (US)

(73) Assignee: Resilient Power Systems, Inc., Statham, GA (US)

( * ) Notice: Subject to any disclaimer, the term of this patent is extended or adjusted under 35 U.S.C. 154(b) by 264 days.

This patent is subject to a terminal disclaimer.

(21) Appl. No.: 17/678,323

(22) Filed: Feb. 23, 2022

(65) Prior Publication Data

US 2022/0348096 A1    Nov. 3, 2022

Related U.S. Application Data

(63) Continuation of application No. 17/244,993, filed on Apr. 30, 2021.

(51) Int. Cl.
*B60L 53/30* (2019.01)
*B60L 55/00* (2019.01)
(Continued)

(52) U.S. Cl.
CPC ............... *B60L 53/30* (2019.02); *B60L 55/00* (2019.02); *H02J 3/381* (2013.01); *H02J 7/35* (2013.01);
(Continued)

(58) Field of Classification Search
CPC .... B60L 53/30; B60L 55/00; H02M 3/33573; H02M 3/33584; H02J 3/381; H02J 7/35
(Continued)

(56) References Cited

U.S. PATENT DOCUMENTS

| 5,642,270 A | 6/1997 | Green et al. |
| 5,926,004 A | 7/1999 | Henze |

(Continued)

FOREIGN PATENT DOCUMENTS

| EP | 2815913 A1 | 12/2014 |
| WO | 2018158453 A1 | 9/2018 |
| WO | 2020244731 A1 | 12/2020 |

OTHER PUBLICATIONS

United States Patent Office, Office Action dated Jun. 23, 2023 in U.S. Appl. No. 17/825,001 (28 pages).

(Continued)

*Primary Examiner* — Richard V Muralidar
(74) *Attorney, Agent, or Firm* — Trop, Pruner & Hu, P.C.

(57) ABSTRACT

In one aspect, an electric vehicle (EV) charging system includes: a plurality of first converters to receive grid power at a distribution grid voltage and convert the distribution grid voltage to at least one second voltage; at least one high frequency transformer coupled to the plurality of first converters to receive the second voltage and electrically isolate a plurality of second converters. The EV charging system may further include the plurality of second converters coupled to the output of the at least one high frequency transformer to receive and convert the at least one second voltage to a third DC voltage. At least some of the plurality of second converters are to couple to one or more EV charging dispensers to provide the third DC voltage as a charging voltage or a charging current.

20 Claims, 14 Drawing Sheets

(51) Int. Cl.
*H02J 3/38* (2006.01)
*H02J 7/35* (2006.01)
*H02M 3/335* (2006.01)

(52) U.S. Cl.
CPC ... *H02M 3/33573* (2021.05); *H02M 3/33584* (2013.01); *B60L 2210/10* (2013.01); *B60L 2210/30* (2013.01); *B60L 2210/40* (2013.01); *H02J 2207/20* (2020.01); *H02J 2300/24* (2020.01); *H02J 2310/48* (2020.01)

(58) Field of Classification Search
USPC ........................................................ 320/109
See application file for complete search history.

(56) References Cited

U.S. PATENT DOCUMENTS

| | | | |
|---|---|---|---|
| 6,664,762 B2 | 12/2003 | Kutkut | |
| 7,256,516 B2 | 8/2007 | Buchanan et al. | |
| 8,824,179 B2 | 9/2014 | Limpaecher | |
| 9,780,682 B2 | 10/2017 | Keister et al. | |
| 9,906,155 B2 | 2/2018 | Keister et al. | |
| 10,131,239 B2 | 11/2018 | Herke et al. | |
| 10,608,545 B2 | 3/2020 | Keister et al. | |
| 10,696,183 B2 | 6/2020 | Roggendorf et al. | |
| 10,811,988 B2 | 10/2020 | Keister et al. | |
| 11,292,352 B1 | 4/2022 | Keister et al. | |
| 11,370,314 B1* | 6/2022 | Keister | B60L 53/22 |
| 11,509,233 B1* | 11/2022 | Keister | B60L 3/0046 |
| 11,557,957 B1* | 1/2023 | Abolhassani | H02M 3/003 |
| 11,648,844 B2 | 5/2023 | Keister et al. | |
| 11,919,416 B2 | 3/2024 | Keister et al. | |
| 2003/0038612 A1 | 2/2003 | Kutkut | |
| 2011/0273917 A1 | 11/2011 | Maitra et al. | |
| 2018/0339601 A1 | 11/2018 | Kruszelnicki | |
| 2020/0161677 A1 | 5/2020 | Yoshioka et al. | |
| 2020/0313443 A1 | 10/2020 | ElMenshawy et al. | |
| 2022/0348101 A1 | 1/2022 | Keister et al. | |
| 2022/0161677 A1 | 5/2022 | Pizzurro et al. | |
| 2022/0348096 A1* | 11/2022 | Keister | H02J 3/322 |
| 2022/0348100 A1 | 11/2022 | Keister et al. | |

OTHER PUBLICATIONS

United States Patent Office, Final Office Action mailed Sep. 28, 2022 in U.S. Appl. No. 17/676,491 (12 pages).

ChargePoint, Inc., CT 4000 Family, ChargePoint Level 2 Commercial Charging Stations, 2021, pp. 1-4.

Tesla; Supercharging Tesla, 2021, pp. 1-7.

United States Patent Office, Notice of Allowance dated Jan. 11, 2023 in U.S. Appl. No. 17/676,491 (11 pages).

International Search Authority, International Search Report and Written Opinion dated Aug. 18, 2022 in International Application No. PCT/US2022/021699 (18 pages).

United States Patent Office, Office Action mailed Jun. 9, 2022 in U.S. Appl. No. 17/676,491 (18 pages).

United States Patent Office, Notice of Allowance dated Oct. 16, 2023 in U.S. Appl. No. 17/825,001 (12 pages).

United States Patent Office, Non-Final Office Action dated Apr. 11, 2024 in U.S. Appl. No. 18/296,627 (25 pages).

* cited by examiner

SYSTEMS, APPARATUS AND METHODS FOR ELECTRIC VEHICLE CHARGING VIA A POWER CONVERSION SYSTEM

CROSS-REFERENCE TO RELATED APPLICATION

The present application is a continuation of U.S. patent application Ser. No. 17/244,993, filed on Apr. 30, 2021, the content of which is hereby incorporated by reference.

BACKGROUND

Power conversion systems are used to interface a variety of different electrical loads with a power system and any associated energy storage. Power conversion systems with transformers provide galvanic isolation and allow loads to be decoupled from distribution systems and to operate at different voltages and frequencies. However, space and energy is limited in many conversion systems.

One power conversion system of current interest is a charger that can be used to charge an electric vehicle (EV). As EVs become more prevalent and are provisioned with varying charge capabilities, there is much interest in EV charging systems. Currently, such charging systems are rather bulky and expensive, and can be somewhat inflexible in charge capabilities. For wide adoption of electric vehicles, higher power fast charging stations are needed.

SUMMARY OF INVENTION

In one aspect, an electric vehicle (EV) charging system includes: a plurality of first converters to receive grid power at a distribution grid voltage and convert the distribution grid voltage to at least one second voltage; at least one high frequency transformer coupled to the plurality of first converters to receive the at least one second voltage and to electrically isolate a plurality of second converters coupled to an output of the at least one high frequency transformer; and the plurality of second converters coupled to the output of the at least one high frequency transformer to receive the at least one second voltage and convert the at least one second voltage to a third DC voltage. At least some of the plurality of second converters are to couple to one or more EV charging dispensers to provide the third DC voltage as a charging voltage or a charging current.

In an example, the plurality of first converters are to receive the distribution grid voltage directly from a distribution grid network without an intervening power transformer. In one case, at least two of the plurality of second converters are to provide the charging voltage to a first EV charging dispenser. The at least two of the plurality of second converters can be connected in series. The at least one high frequency transformer may have a single primary winding and a plurality of secondary windings, where each of the plurality of secondary windings is to provide the at least one second voltage to one of the plurality of second converters.

In an example, the EV charging system further comprises a grid-tie module having the plurality of first converters, the grid-tie module directly coupled to a distribution grid network to receive the distribution grid voltage. The EV charging system may further comprise at least one solar converter coupled to the at least one high frequency transformer and at least one photovoltaic array.

In an example, the EV charging system further includes a controller, in a generation mode, to cause energy from the at least one photovoltaic array to be provided to the distribution grid network via the EV charging system. The controller, in a charging mode, may cause at least some of the energy from the at least one photovoltaic array to be provided to the one or more EV charging dispensers. The controller, in a reverse power mode, is to cause stored energy from an energy storage of an EV coupled to the one or more EV charging dispensers to be provided to the distribution grid network.

In an example, the at least one high frequency transformer is to operate at 5 kilohertz or more. At least one of the plurality of second converters may receive a low voltage from a power generator coupled to the EV charging system, the power generator to generate the low voltage from an ammonia-based source. At least one other of the plurality of second converters may receive the low voltage from the at least one high frequency transformer and provide the third DC voltage to the one or more EV dispensers using the low voltage.

In an example, the EV charging system further includes a controller to obtain power telemetry information from a distribution grid network that provides the grid power, and based at least in part thereon, to cause the EV charging system to compensate the distribution grid network for at least one of reactive power, harmonic current, or voltage sag. The EV charging system may integrate the one or more EV charging dispensers to enable one or more EVs to directly couple to the EV charging system.

In another aspect, an EV charging system comprises: a grid-tie module to directly couple to a distribution grid network at a grid connection and convert a grid voltage to a plurality of high frequency AC voltages; at least one high frequency transformer coupled to the grid-tie module to receive the plurality of high frequency AC voltages and to output a plurality of electrically isolated high frequency AC voltages; and a plurality of EV chargers coupled to the at least one high frequency transformer. Each of the plurality of EV chargers may receive one of the plurality of electrically isolated high frequency AC voltages and provide a DC voltage to at least one EV charging dispenser.

In an example, each of the plurality of EV chargers comprises at least one output stage comprising: an AC-DC converter coupled to the at least one high frequency transformer to receive one of the plurality of electrically isolated high frequency AC voltages and output a first DC voltage; and a DC-DC converter coupled to the AC-DC converter to receive the first DC voltage and output the DC voltage. The grid-tie module may include a plurality of input stages. Each of the plurality of input stages may comprise: an AC-DC converter to receive the grid voltage and output a second DC voltage; and a DC-AC converter coupled to the AC-DC converter to receive the second DC voltage and output the high frequency AC voltage. A first EV charger may comprise a plurality of output stages. A controller may configure the first EV charger to cascade the plurality of output stages to provide the DC voltage comprising a charging voltage.

In an example, the at least one high frequency transformer comprises a single transformer having a single primary winding coupled to the grid-tie module and a plurality of secondary windings, where each of the plurality of secondary windings is coupled to one of the plurality of EV chargers.

In an example, the EV charging system further comprises a controller to control a first EV charger to provide a first DC voltage at a charging voltage level to a first EV charging dispenser in a first mode and to provide a second DC voltage at a charging current level to the first EV charging dispenser in a second mode. The controller may select one of the first mode and the second mode based at least in part on status information of an EV coupled to the first EV charging dispenser. The controller may control the grid-tie module to compensate for one or more of reactive power, harmonic current, or voltage sag.

In an example, the EV charging system further comprises a storage converter coupled to the at least one high frequency transformer. The storage converter may receive energy from a storage device coupled to the EV charging system and convert the energy to a second high frequency AC voltage, and provide the second high frequency AC voltage to the at least one high frequency transformer.

In yet another aspect, a method includes: receiving, in an EV charging system directly coupled to a distribution grid network, a grid voltage at a grid frequency; converting, in a first input stage of the EV charging system, the grid voltage to a first high frequency AC voltage; transforming the first high frequency AC voltage to a second high frequency AC voltage; converting, in a first output stage of the EV charging system, the second high frequency AC voltage to a first DC voltage; and providing the first DC voltage to at least one EV charging station coupled to the EV charging system.

In an example, the method further comprises providing the first DC voltage to a plurality of EV charging stations coupled to the EV charging system. The method may further include: in a first mode, providing the first DC voltage at a charging voltage level to the at least one EV charging station based at least in part on status information of a first EV coupled to the at least one EV charging station; and in a second mode, providing the first DC voltage at a charging current level to the at least one EV charging station based at least in part on status information of a second EV coupled to the at least one EV charging station.

In yet a further aspect, a method includes: receiving, in an EV charging system directly coupled to a distribution grid network, EV power from an EV coupled to the EV charging system; converting, in a first output stage of the EV charging system coupled to the EV, a DC voltage of the EV power to a second high frequency AC voltage; transforming the second high frequency AC voltage to a first high frequency AC voltage; converting, in a first input stage of the EV charging system coupled to the distribution grid network, the first high frequency AC voltage to a grid voltage and a grid frequency; and providing power to the distribution grid network from the first input stage, the power at the grid voltage and the grid frequency.

In an example, the method further comprises: providing the power to the distribution grid network in a reverse mode; and receiving grid power from the distribution grid network and using the grid power to provide a DC voltage to at least one other EV in a forward mode.

In an example, the method further comprises: communicating information between a controller of the EV charging system and the EV; based at least in part on the information, determining that the EV is capable of providing the EV power; and configuring circuitry of the EV charging system for the reverse mode in response to the determining.

DETAILED DESCRIPTION

In various embodiments, an electric vehicle (EV) charging system is provided that enables direct connection to a grid network and generates from received grid power one or more sources of charging power that can be provided to one or more EV charging stations. In this way, EVs connected to an EV charging station can be efficiently charged at a charging voltage and/or charging current that may be dynamically controlled.

Figure 1A:
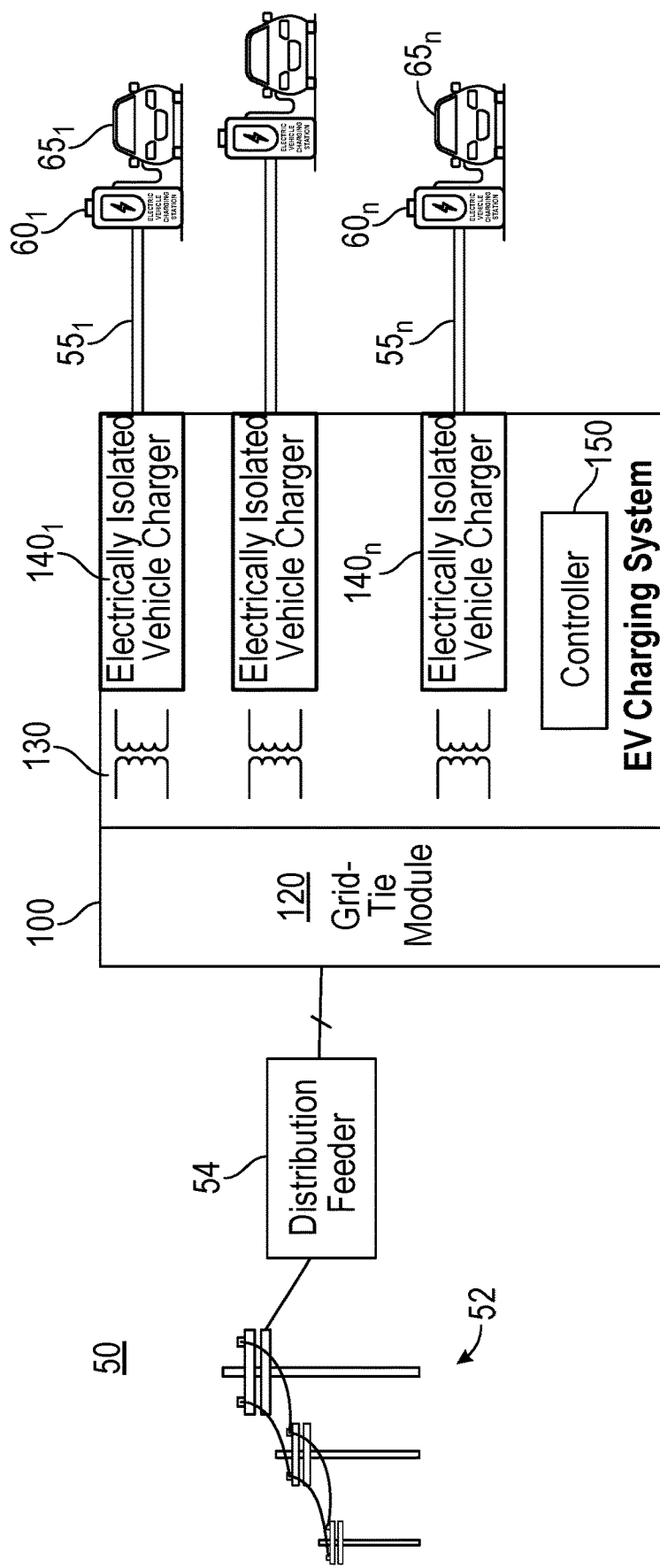
FIG. 1A is a block diagram illustrating an environment in which an EV charging system accordance with an embodiment may be used.

Referring now to FIG. 1A, shown is a block diagram illustrating an environment in which an EV charging system in accordance with an embodiment may be used. More particularly in FIG. 1A, an EV charging system 100, which may be a distributed modular-based charging system, couples between a grid network 50 (represented by transmission lines 52 and a distribution feeder 54) and multiple EV charging stations $60_1$-$60_n$ (also referred to herein as "dispensers"), each of which may be implemented with one or more EV distributors to enable charging of an EV (representative EVs $65_1$-$65_n$ are shown in FIG. 1A).

More specifically, embodiments may be used for use with distribution grid networks that provide power at medium voltage levels (e.g., between approximately 1000 volts (V) and 35000V) and at a low frequency (e.g., 50 or 60 Hertz (Hz)). For ease of discussion, understand that the terms "grid," "grid network" or "distribution grid network" are to be used interchangeably to refer to a power distribution system that provides medium voltage power at low frequency. With embodiments herein, an EV charging system such as charging system 100 may directly couple to a medium voltage distribution grid network (which may be an AC voltage grid or a DC voltage grid) without an intervening power transformer. Stated another way, embodiments provide an EV charging system that can be adapted to couple to a distribution grid network without a step up transformer, also known as a power or distribution transformer.

In this way, EV charging system 100 may directly receive incoming grid power with a grid voltage at a medium voltage level and a low frequency. As used herein, the terms "direct connection" and "direct coupling" with respect to an EV charging system mean that this system receives distribution grid power at a distribution grid network-provided grid voltage at a distribution grid network low frequency without presence of intervening components. Note that an EV charging system may couple to a grid network through a line reactor, a fuse, a circuit breaker, and/or a power circuit disconnect, and still be considered to be in a "direct coupling" with the grid network.

With embodiments, a means is provided for charging electric vehicles or other moving objects. In implementations, high power fast charging may be provided for electric vehicles by connecting to a medium voltage AC or DC distribution feeder. With an EV charging system as described herein, use of components including large magnetics components such as distribution transformer and in-line reactors may be avoided.

Charging system 100 may be implemented as a modular facility. Still further with embodiments herein in which the need for a power transformer is avoided, EV charging system 100 may be implemented with a relatively small and low cost arrangement. For example, in embodiments herein an EV charging system having a total apparent power of 5 megavolt amperes (MVA) may be configured in one or more modular cabinets having approximate dimensions of 2 meters (m)×1.6 m×2.4 m. Thus without the need for a power transformer, an EV charging system may be readily adapted in many different locations such as densely populated urban areas, shopping centers, big box stores, and so forth. In addition, a charging system for EV charging stations may be designed to be power dense and efficient. For purposes of operation, maintenance and packaging, modular and scalable power conversion blocks may be used, and can be the foundation for enabling advanced loads. As such, embodiments provide a modular, power-dense, and efficient power conversion system for EV charging stations.

In industrial power conversion applications, low voltage is typically most cost-efficient at low power levels, while medium voltage is typically superior at high power levels. With embodiments herein, a power density of an EV charging system can be up to 10× greater than an EV charging station having a power transformer (at its input) and a low voltage power conversion scheme. As one example, a power conversion scheme at 12470V versus 480V will require 26 times (12470V/480V=26) less current. Since conductor capacity is determined by $I^2R$ (where I is current and R is resistance), an equivalent 480V charging system would be required to implement conductors that are 675 times larger than conductors for a medium voltage EV charging system in accordance with an embodiment. Continuing with this example, a 1 MW 480V charging system may have a rated current of approximately 1200 amperes root mean squared (Arms), whereas a 1 MW 12470V charging system in accordance with an embodiment may have a rated current of approximately 46.3 Arms. Furthermore, low voltage transformer cost/size typically increases significantly above 1 MVA, such that a typical maximum transformer size for a low voltage charging station is 1 MVA. Thus embodiments may enable lower cost, lower size, lower complexity charging stations that realize greater charging capacity.

Still with reference to FIG. 1A, distribution feeder 54 of grid network 50 may be a medium voltage AC or DC distribution feeder. As illustrated, distribution feeder 54 is directly coupled to EV charging system 100 via three-phase connections.

Charging system 100 includes a grid-tie module 120. In embodiments herein, grid-tie module 120 may be configured to receive grid power at an incoming grid voltage (which as described above may be an AC or DC voltage) and perform an initial conversion of the incoming grid voltage to a voltage that is at different magnitude and/or frequency. Depending on implementation, grid-tie module 120 may convert the incoming grid voltage to one or more DC or AC voltages at different magnitude or frequency. To this end, grid-tie module 120 interfaces with medium voltage AC or DC grid network 50 and utilizes power electronics converters to convert the AC or DC grid voltage to a voltage that is at different magnitude and/or frequency. Grid-tie module 120 may include multiple stages that may be isolated from each other. In other implementations, at least some of these stages may be cascaded together to increase voltage capabilities.

In particular embodiments herein, grid-tie module 120 may include power electronics-based converters to convert the incoming AC or DC grid voltage. As an example, grid-tie module 120 may include so-called H-bridge power converters to receive the incoming grid voltage and perform a voltage/frequency conversion, e.g., to a DC voltage. In turn, grid-tie module 120 may further include a first stage of a DC-DC converter to convert the DC voltage to a high frequency AC voltage (e.g., a square wave voltage) at a given high frequency (e.g., between 5 kilohertz (kHz) and 100 kHz).

As further illustrated in FIG. 1A, this high frequency AC voltage may be provided to a transformer network 130. In the embodiment shown in FIG. 1A, transformer network 130 includes multiple isolated transformers, each having a single primary winding and a single secondary winding. In other implementations a transformer network may take the form of a single transformer having a single primary winding and multiple secondary windings.

In either case, transformer network 130 is configured as a high frequency transformer. In embodiments, transformer network 130 may operate at frequencies between approximately 5 kHz and 100 kHz. By virtue of this high frequency of operation, the need for large magnetics at a front end can be avoided. In one implementation transformer network 130 may have a size of less than approximately 1 m×1 m×0.25 m. Transformer network 130 outputs galvanically isolated AC voltages. In this way, transformer network 130 provides electrical isolation between distribution feeder 54 and EV charging stations 60.

Still referring to FIG. 1A, the secondary windings of transformer network 130 each may be coupled to an electrically isolated vehicle charger 140₁-140ₙ. In embodiments herein, each vehicle charger 140 may be configured as a power electronics converter that converts the secondary voltage output by transformer network 130 to a voltage (e.g., DC) at a different frequency and/or magnitude. More particularly for vehicle charging as described herein, vehicle chargers 140 may include DC-DC converters to provide charge capabilities to at least one EV charging station 60.

Continuing with the above discussion in which an AC voltage is output from transformer network 130, vehicle chargers 140 may include an AC-DC converter as well as a DC-DC converter to provide charging capability at a desired charging voltage and/or charging current.

Figure 1B:
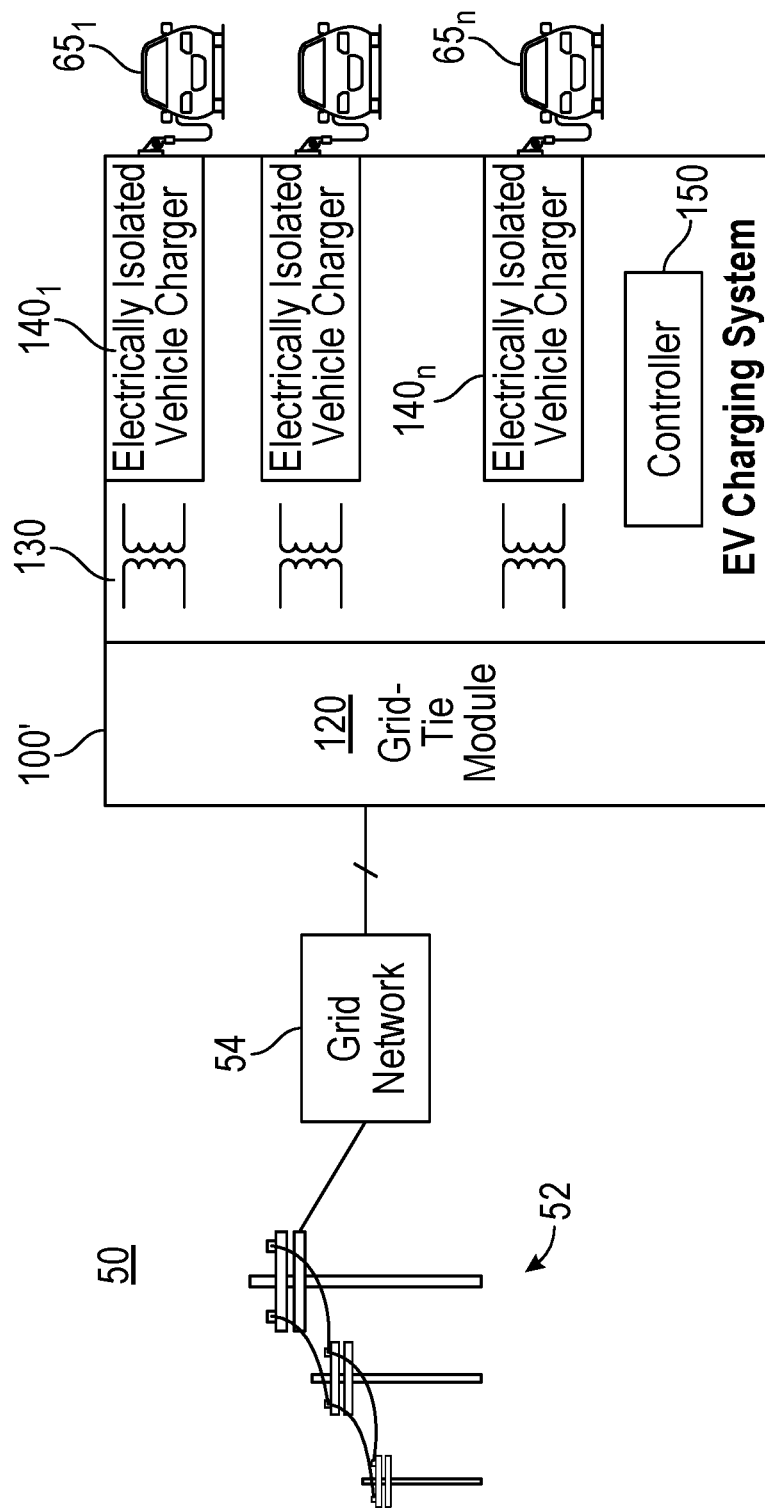
FIG. 1B is a block diagram illustrating another environment in which an EV charging system accordance with an embodiment may be used.

As shown in FIG. 1A, EV charging system 100 may be coupled to charging stations 60 via a plurality of output lines 551-$n$. Although different connection topologies are possible (including direct connection as shown in FIG. 1B, discussed below), FIG. 1A shows an implementation in which each output line 55 is dedicated to a single charging station 60.

To effect control of EV charging system 100, at least one controller 150 may be present. In various embodiments, controller 150 may include one or more central processing units (CPUs) or systems on chip (SoCs), a dedicated microcontroller or other programmable hardware control circuit such as programmable logic. In one embodiment, controller 150 may form a distributed control architecture. In any case, controller 150 may be configured to execute instructions stored in one or more non-transitory storage media. Such instructions may cause controller 150 to automatically and dynamically control charging voltages and/or charging currents depending upon capabilities and requirements of charging stations 60 and/or connected EVs 65.

Controller 150 may be configured to control, in addition to one or more configurable charging modes, one or more generation and/or storage modes, in which energy stored in one or more batteries of an EV may be stored within a storage within or coupled to EV charging system 100 (such as one or more batteries (not shown for ease of illustration in FIG. 1A)) or provided as energy to the grid, e.g., via connection to distribution feeder 54, as will be described further herein.

Although shown with this particular implementation in the embodiment of FIG. 1A, many variations and alternatives are possible. For example, an EV charging system may be configured to directly connect to EVs. Referring now to FIG. 1B, shown is a block diagram illustrating another environment in which an EV charging system in accordance with an embodiment may be used. More particularly in FIG. 1B, an EV charging system 100' may be configured the same as system 100 of FIG. 1A, with the sole difference being that system 100' provides vehicle charging connectors integrated therein such that output lines 55 and charging stations 60 may be eliminated. Thus as shown in FIG. 1B, system 100', via chargers 140 and integrated charging connectors, directly connect to EVs 65.

In still further implementations an EV charging system also may include capabilities to provide load power to a variety of AC loads, such as industrial facilities or so forth. In addition, the EV charging system may be configured to receive incoming energy, such as from one or more photovoltaic arrays or other solar panels and provide such energy, either for storage within the EV charging system, distribution to the grid and/or as charging power to connected EVs.

Figure 2:
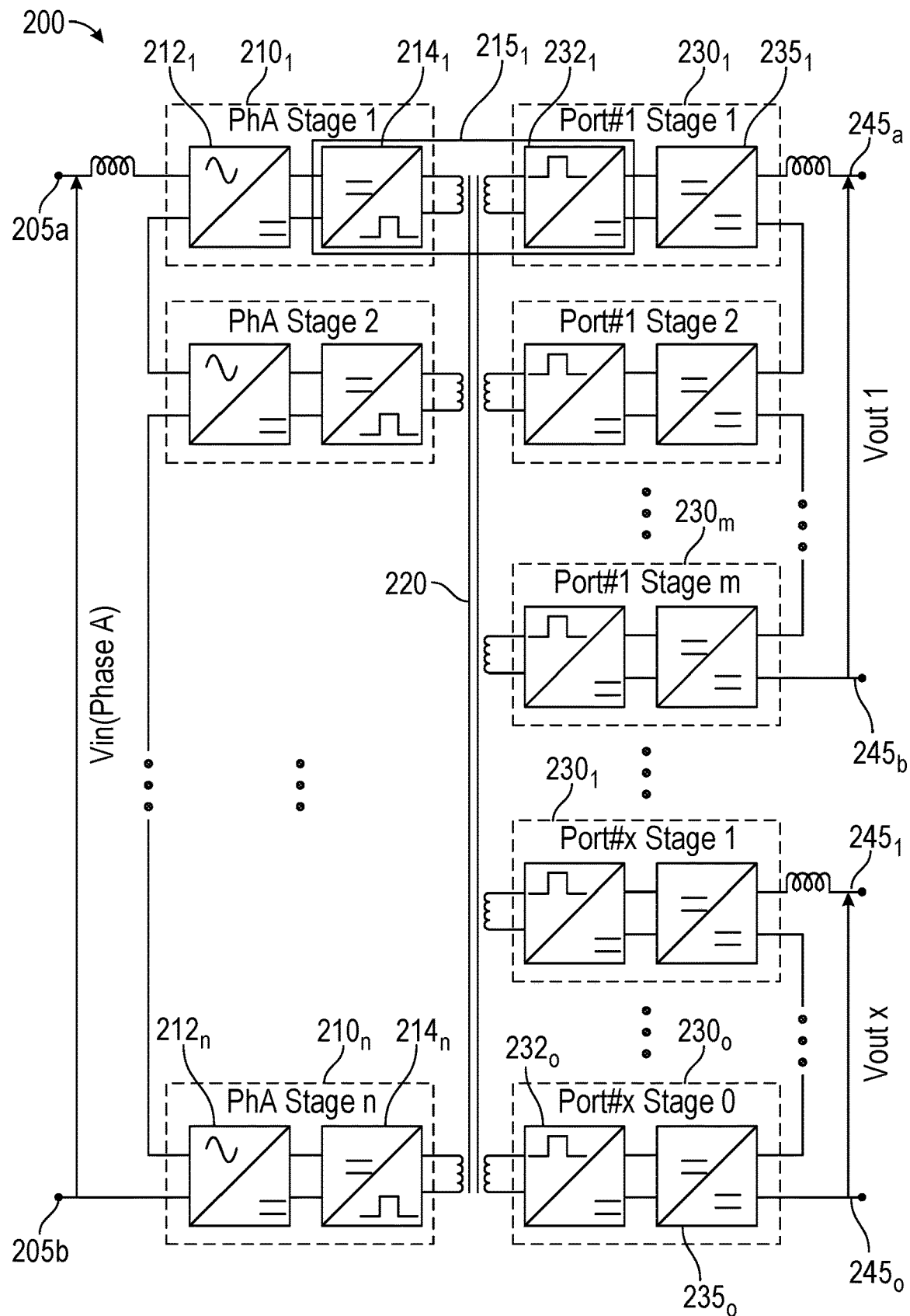
FIG. 2 is a block diagram of an EV charging system in accordance with a particular embodiment.

As described above, different configurations of EV charging systems are possible. Referring now to FIG. 2, shown is a block diagram of an EV charging system in accordance with a particular embodiment. As shown in FIG. 2, EV charging system 200 is a multi-port modular power converter that uses a single transformer. In FIG. 2, understand that a single phase is illustrated for ease of discussion. In a given charging system there may be three phases, each configured as shown in FIG. 2 or combined as a single transformer.

Incoming grid power is received at a given grid voltage via input nodes $205_a$, $205_b$. Although embodiments are not limited in this regard, in FIG. 2 this grid voltage may be received as a medium AC voltage, e.g., at a voltage of between approximately 1 and 50 kilovolts (kV) and at a grid frequency of 50 Hz or 60 Hz. As shown, an input inductance couples to input node $205_a$.

The incoming voltage is provided to a plurality of input stages, each of which may include multiple H-bridge converters. More specifically, a plurality of input stages $210_1$-$210_n$ are shown that are cascaded together. Each input stage may include a grid-side converter $212_{1-n}$ (shown as an AC-DC converter). In turn each grid-side converter 212 couples to a DC-AC converter $214_1$-$214_n$ of a given DC-DC converter $215_1$-$215_n$. Thus each grid-side converter 212 receives an incoming grid AC voltage and converts it to a DC voltage, e.g., at the same or different voltage magnitude. While embodiments may typically implement converters 212 and 214 (and additional converters described below) that are symmetric, it is also possible for there to be asymmetric configurations across power stages.

In an embodiment, each grid-side converter 212 may be implemented as an H-bridge converter including low voltage or medium voltage switches, e.g., silicon carbide (SiC) devices. In other embodiments, each grid-side converter 212 may be formed as a multi-level rectifier. The resulting DC voltages are in turn provided to corresponding DC-AC converters 214 that act as an input stage of an isolated DC-DC converter 215. In embodiments, converters 214 may be implemented as H-bridge converters to receive the DC voltage and convert it to a high frequency AC voltage, e.g., operating at a frequency of up to 100 kHz. While a square wave implementation is shown in FIG. 2, understand that in other cases the AC voltage may be sinusoidal.

The high frequency voltage output from converters 214 may be provided to a corresponding primary winding of a transformer 220, namely a high frequency transformer. While shown in FIG. 2 as a single transformer with multiple primary windings and multiple secondary windings, in other implementations separate transformers may be provided, each with one or more primary windings and one or more secondary windings.

In any event, the galvanically isolated outputs at the secondary windings of transformer 220 may be provided to a plurality of output stages $230_1$-$230_o$. As such each output stage 230 includes an AC-DC converter $232_1$-$232_o$ (of a DC-DC converter 215). Thereafter, the output DC voltage may be further adjusted in magnitude in corresponding load-side converters $235_1$-$235_o$ (and $235_1$-$235_o$).

As illustrated, output stages 230 thus include a given output stage (namely stage 232) of a DC-DC converter 215 and a load-side converter 235. As shown in FIG. 2, multiple output stages 230 may couple together in cascaded fashion (e.g., either in a series connection as shown in FIG. 2 or in a parallel connection) to provide a higher output voltage and/or current depending upon load requirements. More specifically, a first set of output stages $230_1$-$230_m$ are cascaded together and couple to output nodes $245_{a,b}$. In turn, a second set of output stages $230_1$-$230_o$ are cascaded together and couple to output nodes $245_{1,o}$. The resulting outputs are thus at a given DC voltage level and may be used as a charging voltage and/or current for connected EVs. While this particular arrangement with cascaded input and output stages are shown in FIG. 2, understand that a multi-port power converter may be implemented in other manners such as using modular high frequency transformers. Still further, understand that the actual included DC-DC converters may have a variety of different topologies.

Figure 3:
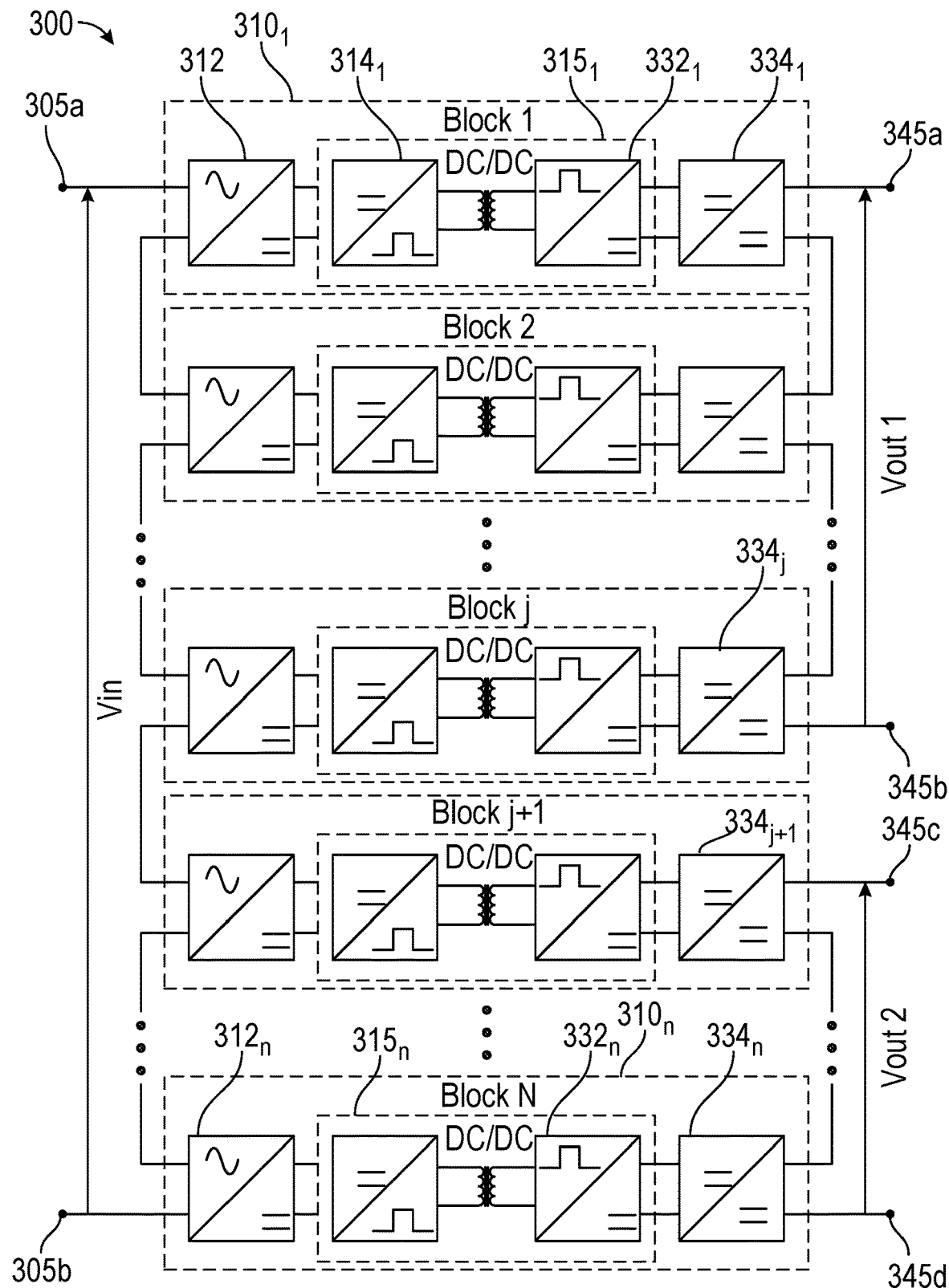
FIG. 3 is a block diagram of an EV charging system in accordance with another embodiment.

For example, in other cases a modular high frequency transformer may be used. Referring now to FIG. 3, shown is a block diagram of an EV charging system in accordance with another embodiment. As shown in FIG. 3, EV charging system 300 is a multi-port modular power converter that uses a modular transformer. As in FIG. 2, a single phase is illustrated for ease of discussion.

Incoming grid power is received at a given grid voltage via input nodes 305a, 305b. The incoming voltage is provided to a plurality of input stages, each of which may include multiple H-bridge converters. More specifically, a plurality of power converter stages $310_1$-$310_n$ are shown. Each stage 310 may include a grid-side converter $312_{1-n}$ (shown as an AC-DC converter) and a DC-AC converter $314_1$-$314_n$ of a given DC-DC converter $315_1$-$315_n$. Via independent transformers of DC-DC converters 315, a resulting electrically isolated DC voltage is provided to an AC-DC converter $332_1$-$332_n$ and thereafter to a load-side converter $334_1$-$334_n$. Note that operation may be similar to that discussed in FIG. 3. In one embodiment, each load-side converter $334_1$-$334_n$ may provide a voltage to the load, e.g., connected electric vehicles. However here note that potentially different amounts of load-side converters 334 may be cascaded to provide a given DC voltage to a load (e.g., EV charging station). As one example, a first set of load-side converters $334_1$-$334_j$ may provide a first charging voltage of approximately 1500 volts via output nodes 345a,b. And a second set of load-side converters $334_{j+1}$-$334_n$ may provide a second charging voltage of approximately 1000 volts via output nodes 345c,d.

Figure 4A:
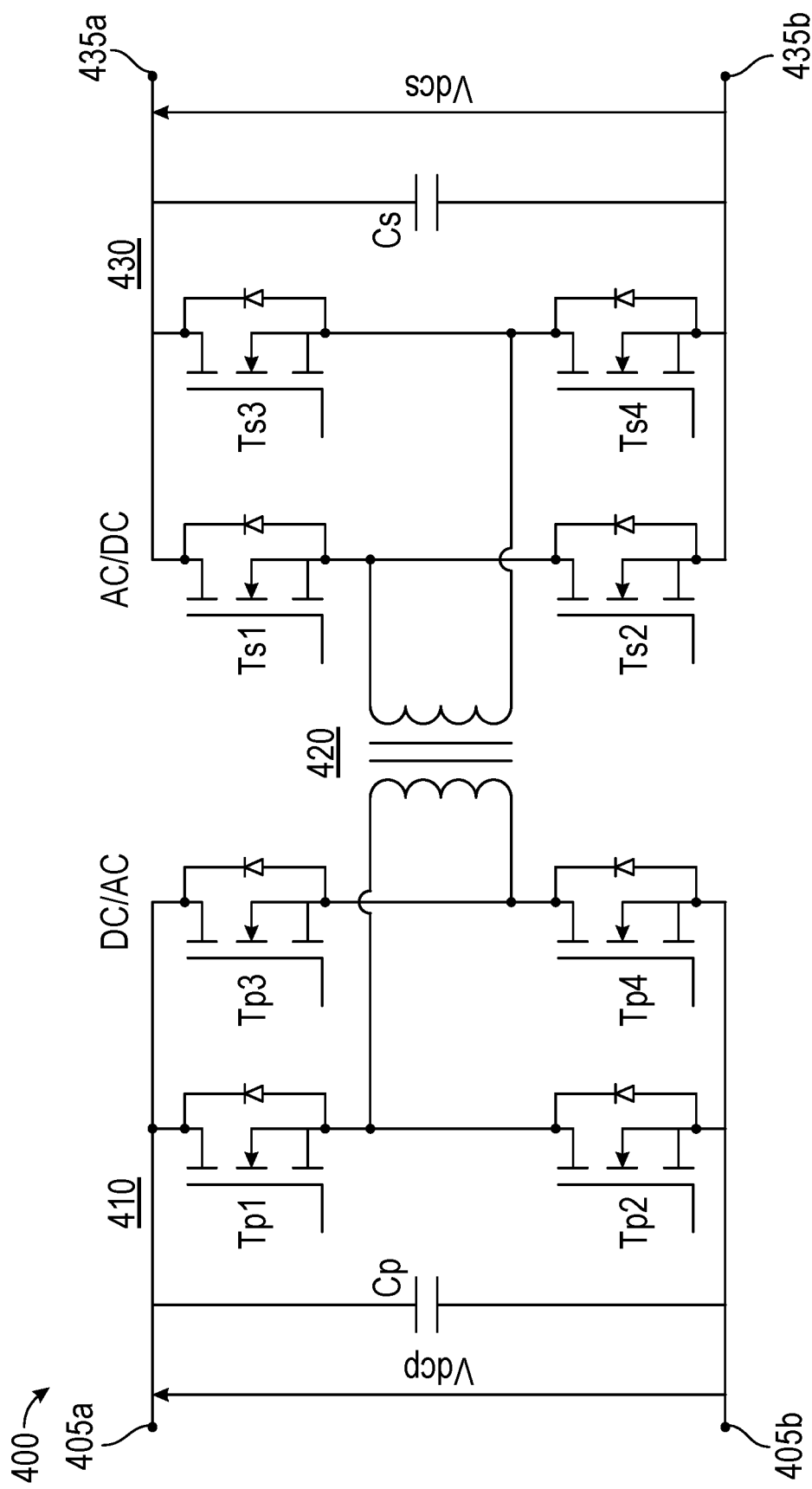
FIG. 4A is schematic diagram of an example DC-DC converter in accordance with an embodiment.

Referring now to FIG. 4A, shown is a schematic diagram of an example DC-DC converter in accordance with an embodiment. As shown in FIG. 4A, DC-DC converter 400 is implemented as a dual active bridge (DAB) isolated DC-DC converter. In various implementations, converter 400 may be used in a multi-port modular power converter such as those shown above in FIGS. 2 and 3 and/or other EV charging systems.

In the high level shown in FIG. 4A, converter 400 includes an input stage 410 having a plurality of SiC switches Tp1-Tp4. As shown, switches Tp1-Tp4 are implemented in an H-bridge configuration and couple to input nodes 405a,b that receive an incoming DC voltage Vdcp. As shown, a parallel capacitance Cp couples between the input nodes. In turn, the midpoints between serially coupled SiC switches Tp1, Tp2 and Tp3, Tp4 couple to an input winding, namely a primary winding of a high frequency transformer 420. In embodiments herein, high frequency transformer 420 may be configured to operate at frequencies between approximately 5 kHz and 100 kHz.

Still in reference to FIG. 4A, the secondary winding of high frequency transformer 420 in turn couples to the midpoints of serially connected SiC switches Ts1, Ts2 and Ts3, Ts4 of an output stage 430. As illustrated, output stage 430 further includes a capacitance Cs coupled between output ports 435a,b that provide an output DC voltage Vdcs. It is noted that switches Tp1-Tp4 and Ts1-Ts4 can be any type of power semiconductor switches including Silicon (Si) or Silicon Carbide (SiC), Gallium Nitrite (GaN) metal oxide semiconductor field effect transistors (MOSFETs) or insulated gate bipolar transistors (IGBTs).

With this arrangement implementing SiC or other high speed silicon power switches, improved conversion efficiency may be realized as a result of lower switching losses. In one implementation, SiC devices as in FIG. 4A may be implemented with low voltage switches such as 1700V SiC MOSFETs. Use of low voltage switches reduces the stress on insulation, dv/dt and parasitic capacitances, along with high reliability.

In addition, thermal management may be simplified, e.g., resulting in smaller and less expensive heat sinks or cooling systems, and/or replacement of fluid/forced air with natural cooling. Still further with embodiments, passive components (inductors, capacitors) may be downsized at higher switching frequencies. For example, with reference back to FIG. 4A, the input and output side capacitances may be on the order of approximately 40 microFarads. Also with a DAB design as in FIG. 4A, a power converter may be realized with greater simplicity and controllability, low switching losses, low sensitivity to system parasitic elements, bidirectional power flow, and the possibility to achieve Zero Voltage Switching (ZVS) for all semiconductors to allow for a high switching frequency and efficiency.

Figure 4B:
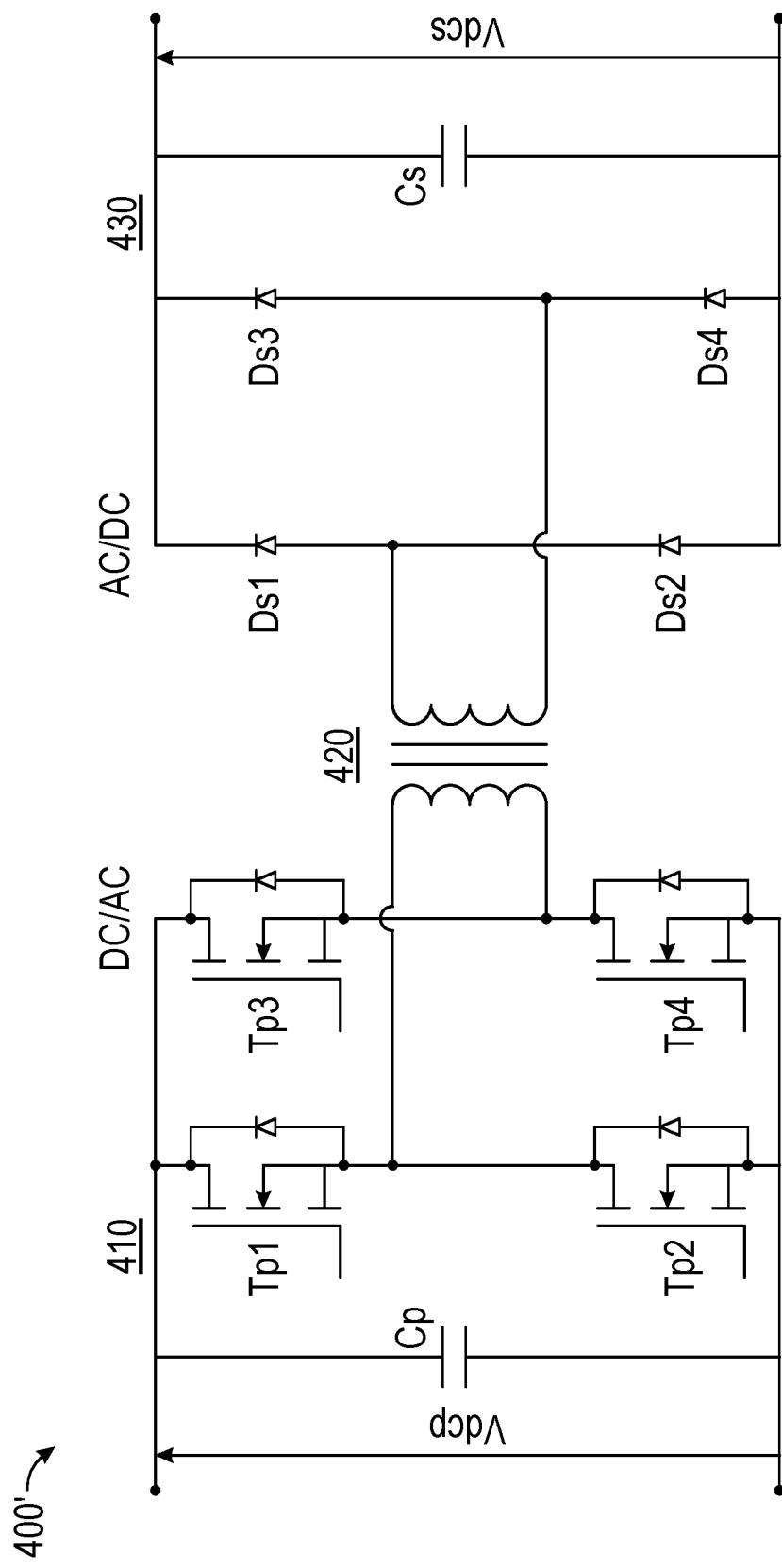
FIG. 4B is schematic diagram of an example DC-DC converter in accordance with another embodiment.

Referring now to FIG. 4B, shown is a schematic diagram of an example DC-DC converter in accordance with another embodiment. As shown in FIG. 4A, DC-DC converter 400' may be have a front end implemented the same as converter 400 of FIG. 4A. however here, the secondary side is implemented with passive devices, namely diodes Ds1-Ds4. With this implementation, power flow is unidirectional from grid to EV's, such that reverse power flow from EV to grid does not occur here.

Figure 5:
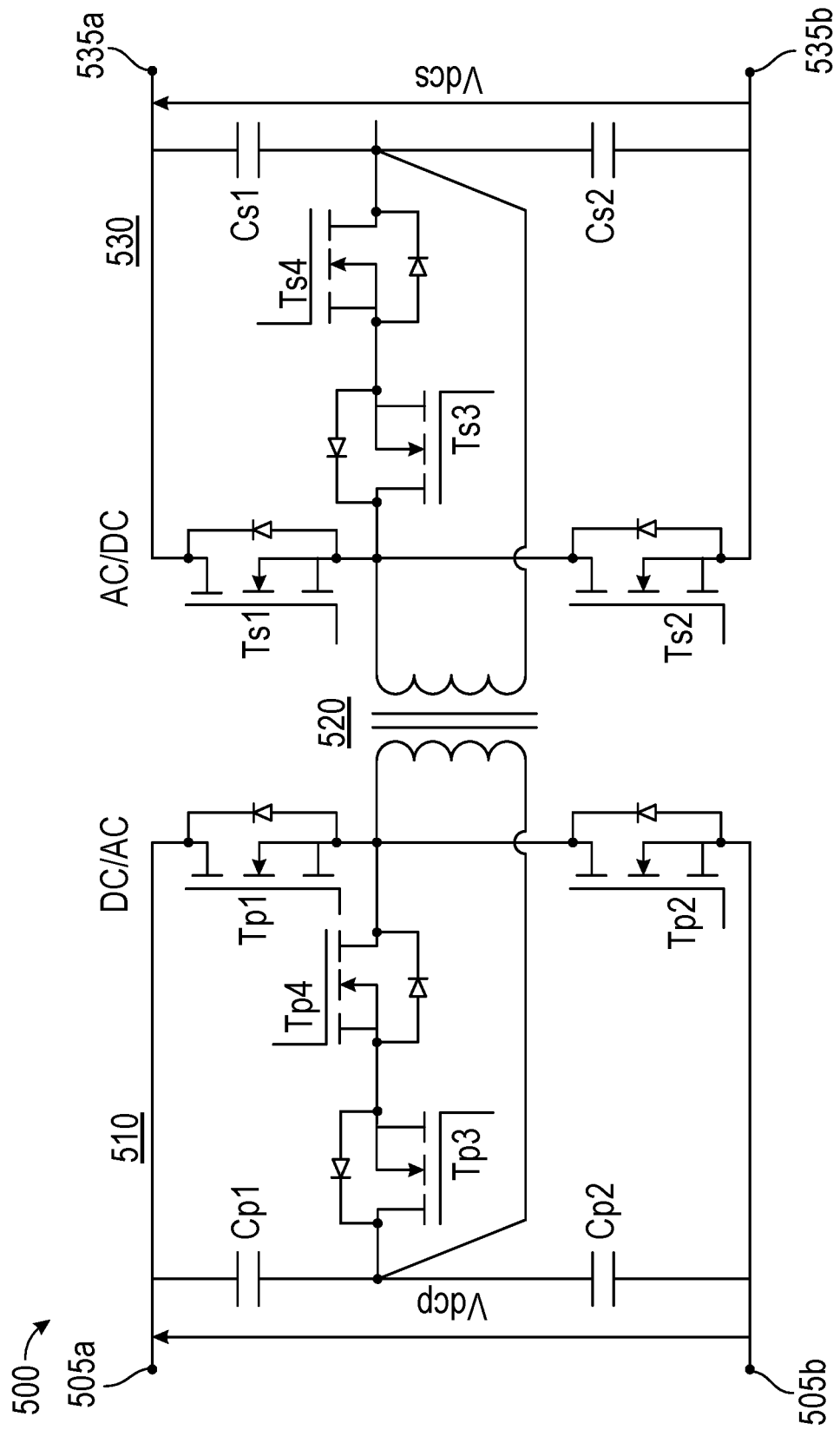
FIG. 5 is a schematic diagram of an example DC-DC converter in accordance with yet another embodiment.

In another embodiment, a DC-DC converter may take the form of a T-type bidirectional isolated DC-DC converter. Referring now to FIG. 5, shown is a schematic diagram of an example DC-DC converter in accordance with yet another embodiment. While formed of SiC devices, note the topology in FIG. 5 has SiC devices Tp1 and Tp2 coupled in series between input nodes 505a,b, and SiC devices Tp3 and Tp4 coupled in series between an input winding of a transformer 510 and input capacitors Cp1, Cp2. Similarly an output stage 530 has a T-type arrangement of SiC devices Ts1-Ts4 that providing switching between a secondary winding of transformer 520 and output nodes 535a,b having an output capacitance Cs1, Cs2 coupled therebetween. As above, switches Tp1-Tp4 and Ts1-Ts4 can be any type of power semiconductor switches including Si, SiC, and/or GaN MOSFETs or IGBTs. Of course other implementations of DC-DC converters are possible in other embodiments.

Figure 6:
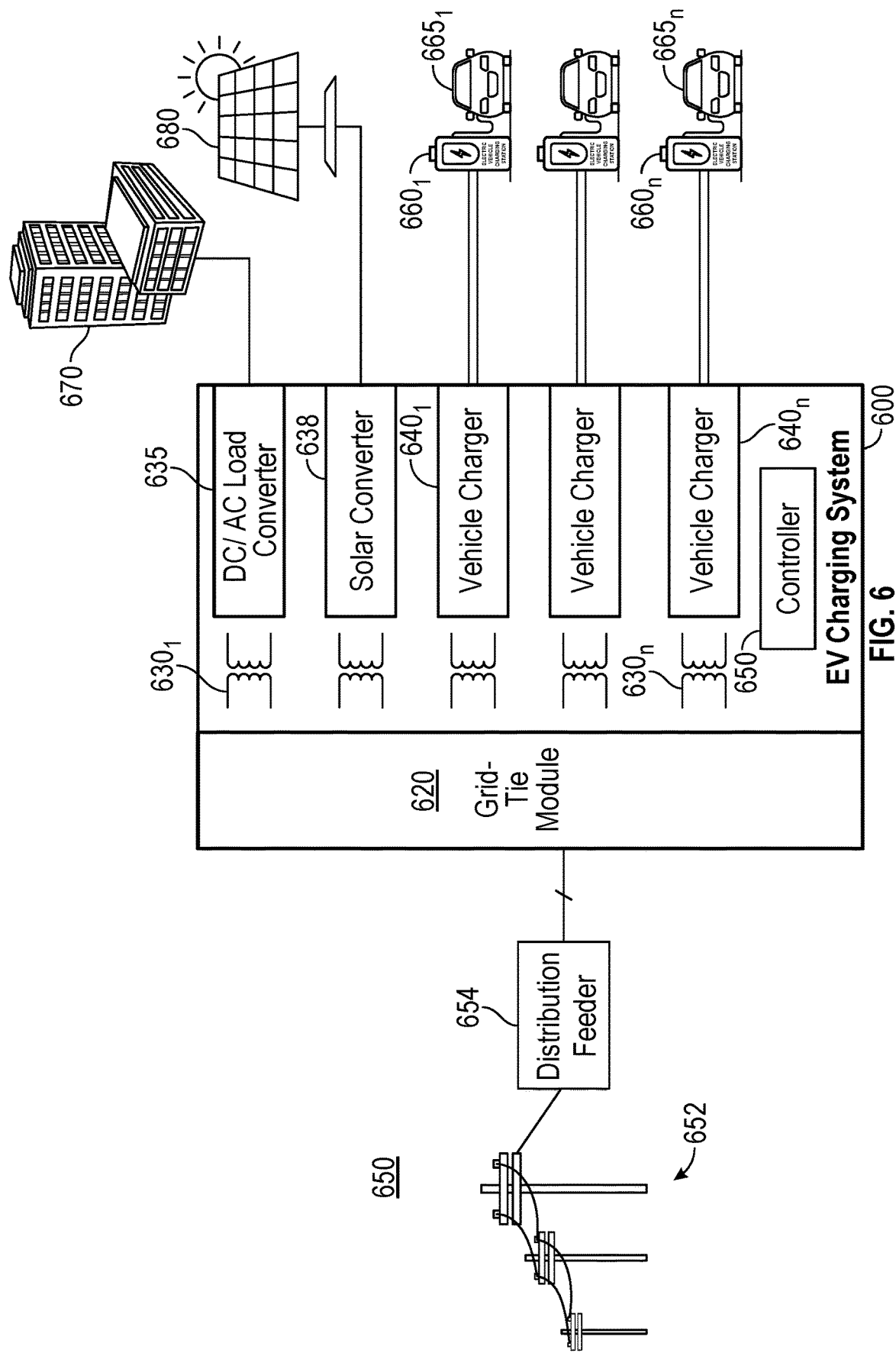
FIG. 6 is a block diagram illustrating an environment in which an EV charging system in accordance with another embodiment may be used.

Referring now to FIG. 6, shown is a block diagram illustrating an environment in which an EV charging system in accordance with another embodiment may be used. More particularly in FIG. 6, an EV charging system 600 may be generally similarly configured the same as EV charging system 100 of FIG. 1A (and thus reference numerals generally refer to the same components, albeit of the "600" series in place of the "100" series of FIG. 1A). However in this embodiment, system 600 includes at least one DC-AC load converter 635 to provide AC power to a facility 670. As further shown, system 600 also includes a solar converter 638 that may couple to a solar photovoltaic panel 680. In this way, incoming solar energy can be provided to grid network 650, to EV charging stations 660 and/or stored in an energy storage (such as a battery system of system 600 (not shown for ease of illustration in FIG. 6)). Thus with this embodiment, EV charging system 600 may couple to one or multiple AC or DC loads and/or to one or multiple solar photovoltaic panels.

Figure 7:
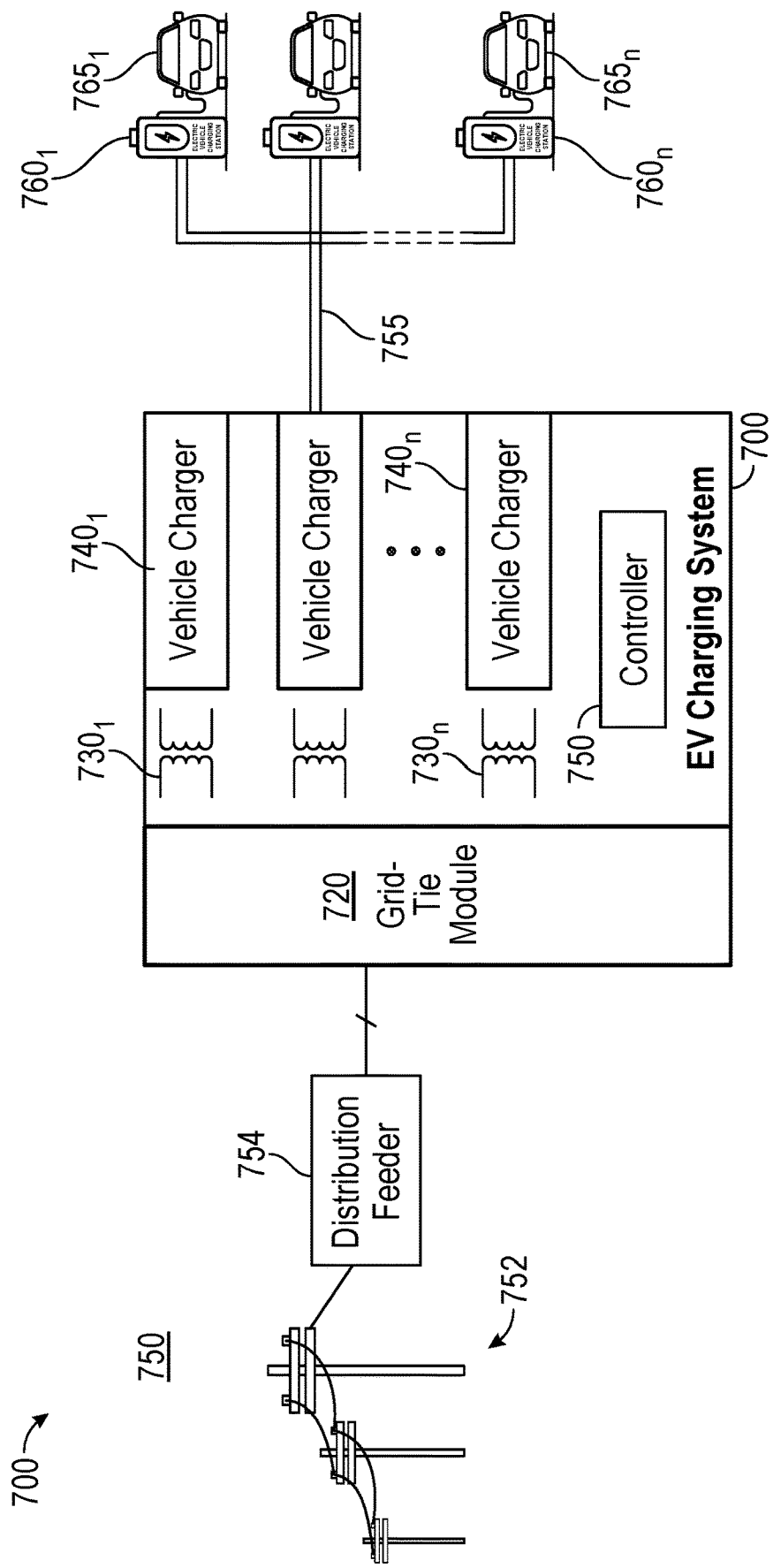
FIG. 7 block diagram illustrating an environment in which an EV charging system in accordance with a further embodiment may be used.

Still further implementations are possible. For example, isolated vehicle charger section can interface with multiple EV charging dispensers. Referring now to FIG. 7, shown is a block diagram illustrating an environment in which an EV charging system in accordance with a further embodiment may be used. More particularly in FIG. 7, an EV charging system 700 may be generally similarly configured the same as EV charging system 100 of FIG. 1A (and thus reference numerals generally refer to the same components, albeit of the "700" series in place of the "100" series of FIG. 1A). However in this arrangement, EV charging system 700 may be configured such that a single vehicle charger 740 couples via output lines 755 to multiple EV charging dispensers 760.

In yet other embodiments, an EV charging system may provide volt-ampere reactive power compensation to a utility that enables maximum power to be delivered to the charging system without exceeding distribution feeder capacity.

Figure 8:
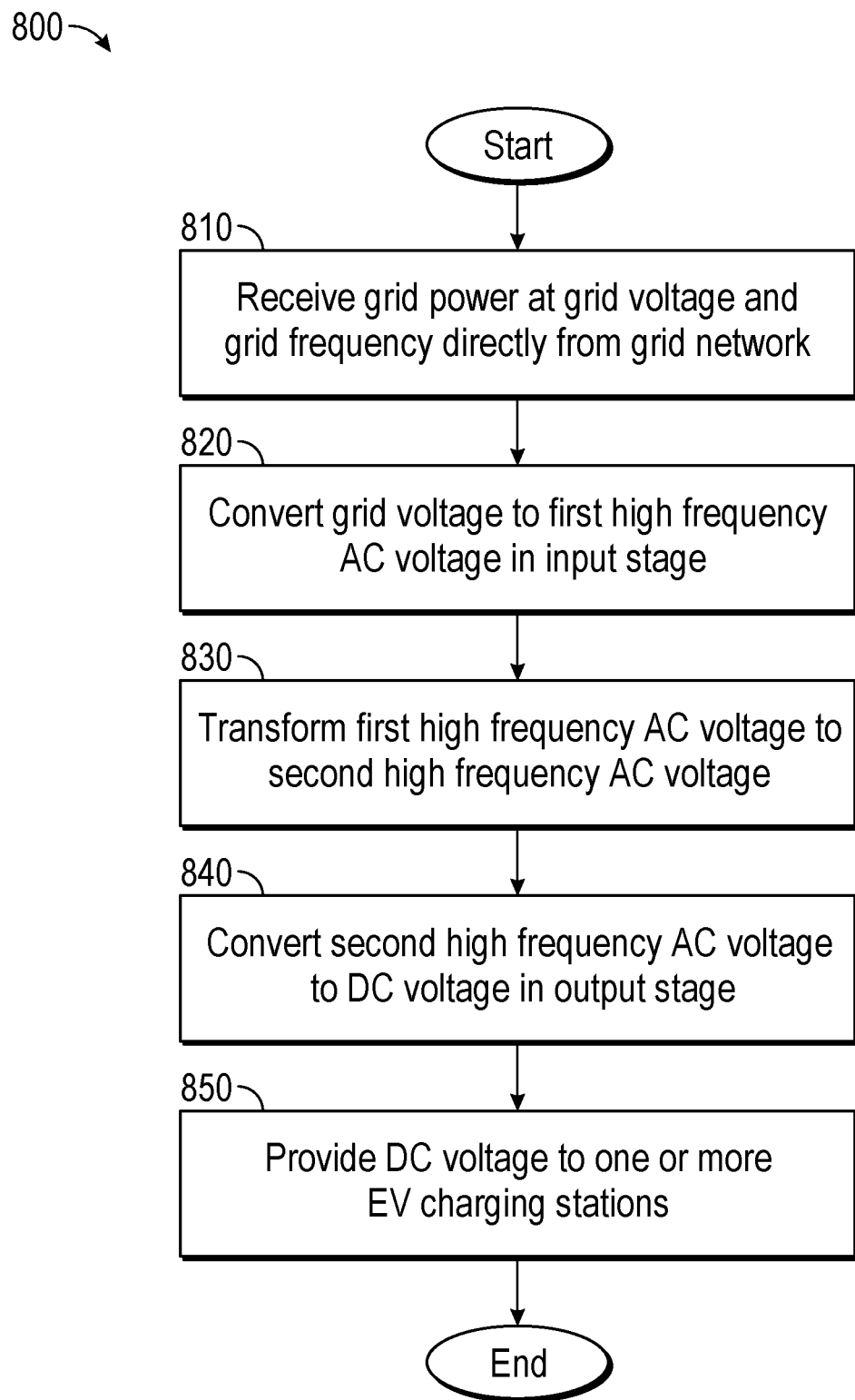
FIG. 8 is a flow diagram of a method in accordance with an embodiment.

Referring now to FIG. 8, shown is a flow diagram of a method in accordance with an embodiment. As shown in FIG. 8, method 800 is a method for controlling an EV charging system in accordance with an embodiment. As an example, method 800 may be performed by an EV charging system such as any of those described above. In part, method 800 may be executed using instructions stored in one or more non-transitory storage media such as may be executed by a hardware circuit (e.g., a CPU, SoC, microcontroller, or so forth). In other implementations, a pure hardware-based arrangement may be present in which an EV charging system is hard-wired for a particular configuration. And of course, varying degrees of programmability and configurability may be present in different implementations.

As illustrated, method 800 begins by receiving grid power at a grid voltage and a grid frequency (block 810). In an embodiment, this grid power (at medium voltage) may be directly received from a distribution grid network in a grid-tie module of an EV charging system. Next at block 820 the grid voltage is converted to a first high frequency AC voltage. More particularly, in an input stage, e.g., of the grid-tie module, the incoming grid voltage (e.g., at a voltage up to 50 kV and at a grid frequency of 50 Hz or 60 Hz) may be converted to an AC voltage at a frequency between approximately 5 kHz and 100 kHz.

Still referring to FIG. 8, next at block 830 this first high frequency AC voltage is transformed to a second high frequency AC voltage. Note that this transformation, which may be performed in one or more high frequency transformers, acts to provide electrically isolated high frequency AC voltages to different EV chargers. Then at block 840 the second high frequency AC voltage is converted to a DC voltage. More specifically, in an output stage, e.g., of an EV charger, the second high frequency AC voltage is converted to a DC voltage at a given charging voltage and/or current. Finally, at block 850 this DC voltage is provided to one or more EV charging stations that may use the voltage to charge one or more connected EVs.

Note that the level of the DC voltage and its provision for charging one or more connected EVs may be based at least in part on communications with the EV. For example, when an EV is plugged into an EV charging system with minimal charge remaining in its battery (and communicates status information including its current capacity) the controller may cause the DC voltage to be provided as a charging current to realize faster charging. Then when the battery is closer to a full charge (and updated status information is communicated), the controller may cause the DC voltage to be provided as a charging voltage to complete the charge. Understand while shown at this high level in the embodiment of FIG. 8, many variations and alternatives are possible.

Further understand that in different implementations, an EV charging system may provide fast charging higher power levels, resulting in fast charging with potentially dramatically reduced charge times. As one example, an extreme fast charging system in accordance with an embodiment may operate a power levels of 350 kiloWatts (kW) or more, and be capable of effecting a charge time of approximately 15 minutes or less for a 200 mile capacity. In contrast, conventional EV fast chargers that operate up to approximately 140 kW may incur over 35 minutes for an equivalent charge.

Thus embodiments that directly couple to a medium voltage distribution grid may provide significantly faster charging times, with a smaller, cheaper charging system.

In many regions, the cost of electricity varies with conditions, including demand. Oftentimes, electricity is cheaper at night than during at least certain hours of the day. Some consumers having EVs may take advantage of this situation by charging their EV at night (e.g., using a low voltage home charger) when costs are lower. Then when electricity prices are higher during peak demand hours (e.g., daytime), a consumer may choose to discharge stored energy from the EV to the grid, e.g., via an EV charging system in accordance with an embodiment.

As such, embodiments may provide a mechanism for reverse power flow from an EV to a grid via an EV charging system that can be dynamically re-configured to provide at least partial reverse power flow. For example, one or more EVs may couple to an EV charging system to provide this power flow while at the same time, one or more other EVs coupled to the EV charging system receive charging power (e.g., in a fast charging mode at high power levels).

Figure 9:
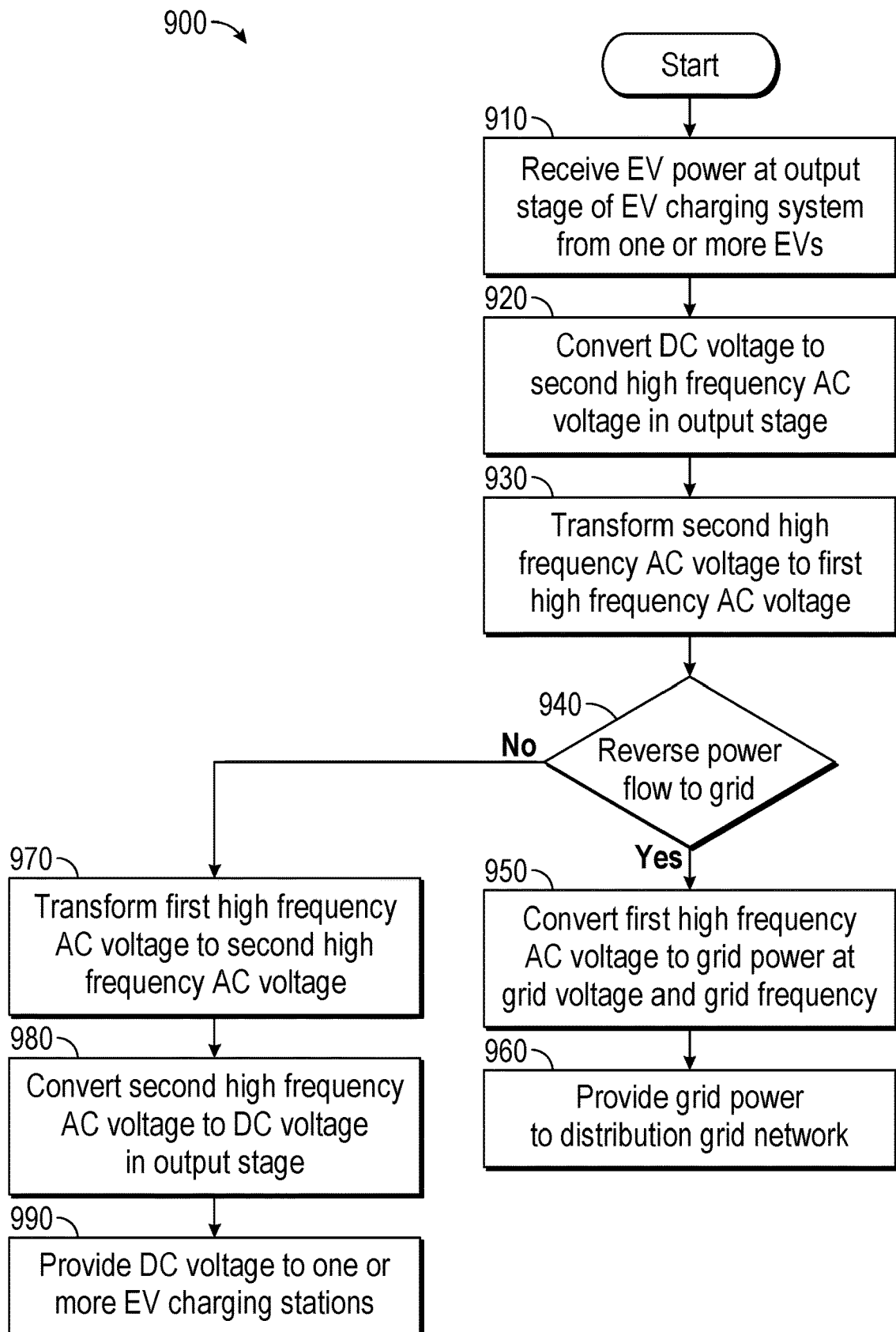
FIG. 9 is a flow diagram of a method in accordance with another embodiment.

Referring now to FIG. 9, shown is a flow diagram of a method in accordance with another embodiment. More specifically, method 900 of FIG. 9 is a method for providing a reverse power flow, namely from a battery or other energy storage device(s) of one or more EVs to a distribution grid. As such, method 900 may be performed by an EV charging system such as any of those described above. In part, method 900 may be executed using instructions stored in one or more non-transitory storage media such as may be executed by any form of controller (such as described in FIGS. 1A and 8, for example).

As illustrated, method 900 begins by receiving EV power at an output stage of an EV charging system from one or more EVs (block 910). As an initial matter, note that prior to this reverse power flow, there are initial communications between the EV and the EV charging system (and more specifically, with the controller of the EV charging system) to provide capability information, including a desire to participate in this reverse power flow, battery status information, among potentially additional information such as safety status information (e.g., power connector engaged, vehicle ready, electrical insulation detection) and so forth. In turn, the controller may confirm that the EV is capable of such reverse power flow and determine appropriate parameters for this power delivery. Accordingly, the controller may configure, e.g., switching circuitry of an output stage of the EV charging system to receive this EV power and additional circuitry of the EV charging system to direct this power flow to an appropriate destination.

Still in reference to FIG. 9, next at block 920 this incoming DC voltage of the EV power may be converted in a load-side converter to a second high frequency AC voltage in the output stage. Such operation may proceed in a reverse direction as described above such that the incoming DC voltage is converted to an AC voltage at a given high frequency (e.g., 50 kHz). Thereafter, this second high frequency AC voltage is transformed to a first high frequency AC voltage in a transformer network of the EV charging system (block 930).

Still referring to FIG. 9, next at diamond 940 it may be determined whether this reverse power flow is intended to be provided to the grid. This determination may be based on a configuration setting of the EV charging system, either statically or dynamically. Such determination may be based on considerations as to whether the grid network is in need or desire of receiving such power. If so, control passes to block 950 where the first high frequency AC voltage can be converted to a grid power level. More specifically, the grid-tie module may provide the first high frequency AC voltage to a grid power level at a grid voltage and grid frequency. Thereafter, via the grid-tie module of the EV charging system, this grid power is provided to the distribution grid network (block 960).

In other cases it is possible for the reverse power flow received from an EV to be provided as charging power to one or more other EVs also connected to the EV charging system. In this instance, the control flow from diamond 940 instead proceeds to block 970. There, a first high frequency AC voltage (at the transformer network input side) is transformed to a second high frequency AC voltage (at the transformer network output side). Then at block 980 the second high frequency AC voltage is converted to a DC voltage. More specifically, in an output stage, e.g., of an EV charger, the second high frequency AC voltage is converted to a DC voltage at a given charging voltage and/or current. Finally, at block 990 this DC voltage is provided to one or more EV charging stations that may use the voltage to charge one or more connected EVs. Understand that in various use cases, one or more EVs can supply power to the grid while at the same time one or more other EVs may receive power from the grid, such that the grid supplies a difference between received and provided power. Understand that while shown at this high level in the embodiment of FIG. 9, variations and alternatives are possible.

Figure 10:
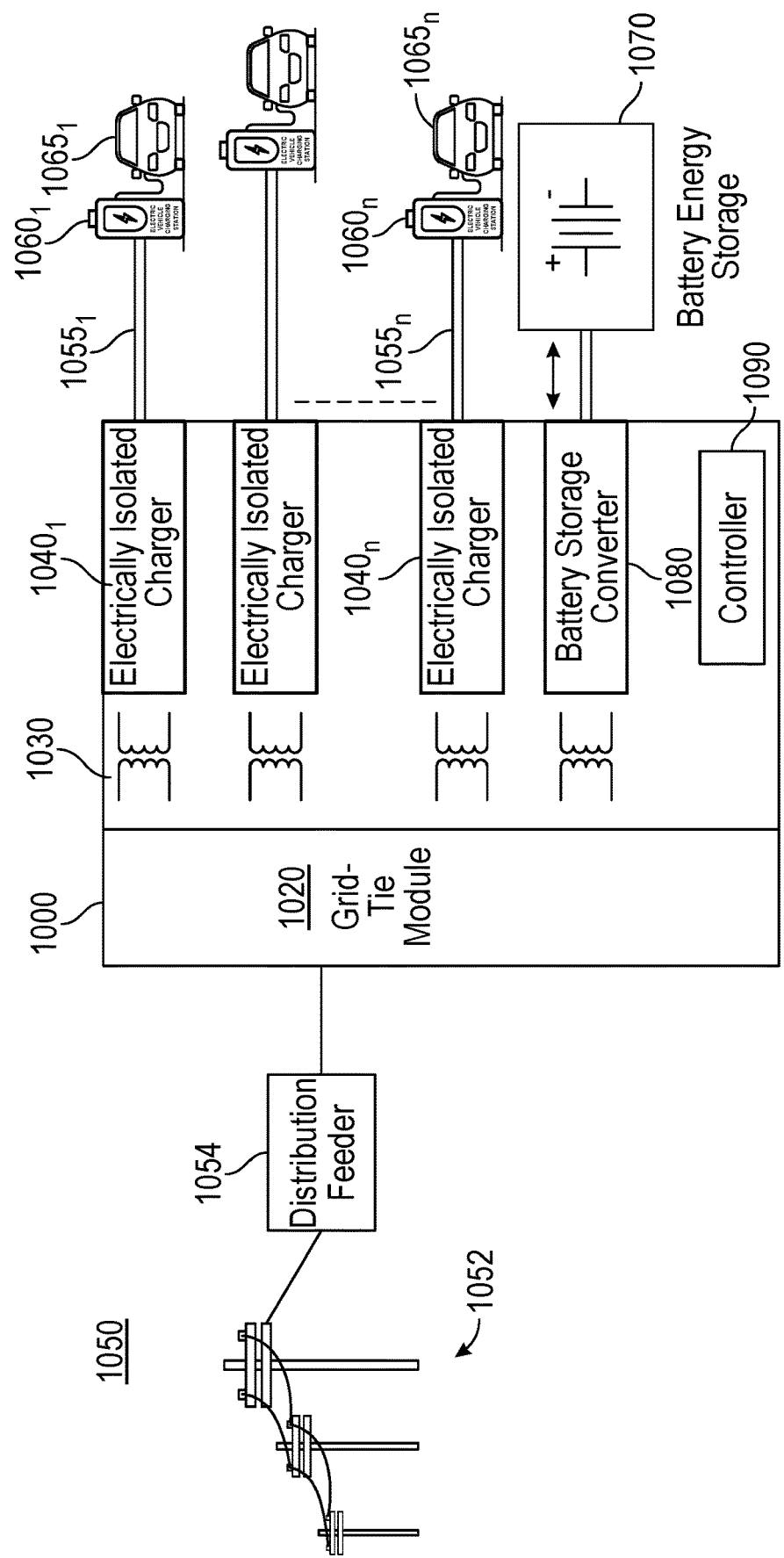
FIG. 10 is a block diagram illustrating another environment in which an EV charging system accordance with an embodiment may be used.

Referring now to FIG. 10, shown is a block diagram illustrating an environment in which an EV charging system in accordance with another embodiment may be used. More specifically as shown in FIG. 10, the EV charging system 1000 may be generally configured the same as EV charging system 100 of FIG. 1A (and thus reference numerals generally refer to the same components, albeit of the "1000" series in place of the "100" series of FIG. 1A). However, in this embodiment, note that EV charging system 1000 further includes a battery storage converter 1080. As shown, battery storage converter 1080 couples to a battery energy storage 1070. Note that while battery energy storage 1070 is a separate component coupled externally to EV charging system 1000, in other implementations battery energy storage 1070 may be included internally to EV charging system 1000.

In embodiments herein, battery storage converter 1080 may be configured to receive power from storage 1070 at a given DC voltage, and perform a conversion to an appropriate high frequency AC voltage, such that this voltage can be provided to transformer network 1030 and then in turn be provided to one or more EV chargers 1040 for use in generating a DC voltage for provision to a given EV charging station 1060. Of course it is possible to instead provide such battery power to distribution grid 1050 via a reverse flow technique such as discussed above, in other cases.

Note that depending on configuration, the received energy can be transformed and passed through to grid-tie module 1020 before being converted and directed to one or more EV charging stations 1060. Such operation may occur where there are multiple independent transformers as shown in FIG. 10. In an implementation with a single transformer, its magnetic circuitry may be sufficient that the transformed AC voltage from one secondary winding can be directed to one or more other secondary windings and without being passed to grid-tie module 1020.

Figure 11:
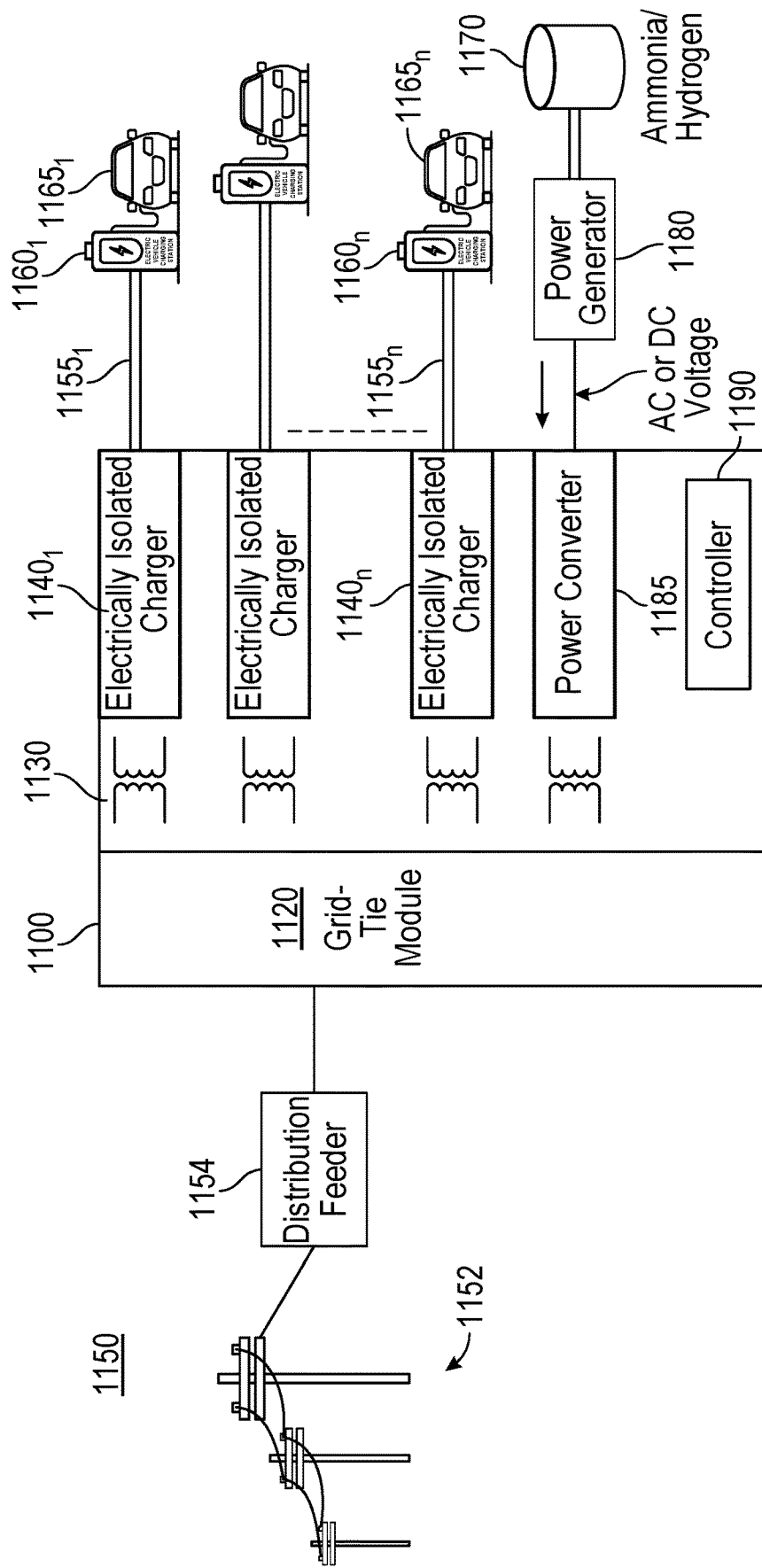
FIG. 11 is a block diagram illustrating yet another environment in which an EV charging system accordance with an embodiment may be used.

Referring now to FIG. 11, shown is a block diagram illustrating an environment in which an EV charging system in accordance with another embodiment may be used. More specifically as shown in FIG. 11, EV charging system 1100 may be generally configured the same as EV charging system 100 of FIG. 1A (and thus reference numerals generally refer to the same components, albeit of the "1100" series in place of the "100" series of FIG. 1A). However, in this embodiment, note that EV charging system 1100 further includes an power converter 1185. As shown, power converter 1185 couples to a power generator 1180.

Power generator 1180 may be configured to generate a low voltage AC or DC voltage. More particularly in embodiments, power generator 1180 may generate an output voltage at approximately 480 volts. As shown, power generator 1180 may generate power from a given energy source, which in this case is an ammonia/hydrogen source 1170.

In the embodiment of FIG. 11, power converter 1185 may convert this incoming voltage to an appropriate high frequency AC voltage, such that this voltage can be provided to transformer network 1130 and then in turn be provided to one or more EV chargers 1140 for use in generating a DC voltage for provision to a given EV charging station 1160. Of course it is possible to instead provide such low voltage power via a reverse flow technique such as discussed above to distribution grid 1150 in other cases.

Along with the increasing of electricity load type and capacity such as in connection with EV charging as described herein, power quality issues, especially reactive power and harmonics, may affect reliable operation of a power grid. Various control mechanisms may be used to compensate for such power quality issues. In contrast to conventional mechanisms which use additional components, no further components are needed. That is, conventional techniques to control reactive power in a grid network use a static synchronous compensator, which is a dynamic shunt compensator, or a static VAR compensator.

Instead with embodiments, a compensation control mechanism can effectively compensate the reactive power, suppress harmonic currents and provide voltage support for a grid network to which an EV charging system is coupled. Embodiments thus can provide charging power to multiple EVs, while concurrently improving power quality of the grid network, by effective reactive power and harmonics compensation at a grid connection. Thus a grid-tie module can exchange reactive power into a grid network to provide reactive power compensation at the grid connection. Such operation may occur concurrently with active power flow from the grid network to connected EVs or injection of reactive power into grid network. Accordingly, an EV charging system in accordance with an embodiment may provide dynamic reactive power compensation while concurrently providing charging power to one or more EVs.

More specifically, fast feedbacks and control loops, in combination with high speed switches of input and output stages, enable rapid compensation for reactive power and suppress harmonic currents. To this end, a controller may, based on feedback information, control phase shifting of the voltage of grid-side converters (e.g., converters $212_{1-n}$ in FIG. 2) of the inputs to one or more transformers of a transformer network, by appropriate control of switching devices of input stages within a grid-tie module.

In addition, embodiments can act quickly to supply reactive power to correct voltage sag (voltage dip) caused by temporary events including short circuits, overloads and starting electric motors. As an example, voltage sag may occur when RMS voltage decreases between approximately 10-90% of nominal voltage for one-half cycle to one minute. When a voltage sag is detected, a quick response can occur without the need for external compensation components. To this end, a controller may provide reactive power to accommodate for this condition by appropriate control of the voltage phase shift of the grid side converters within the input stages of transformer networks.

Figure 12:
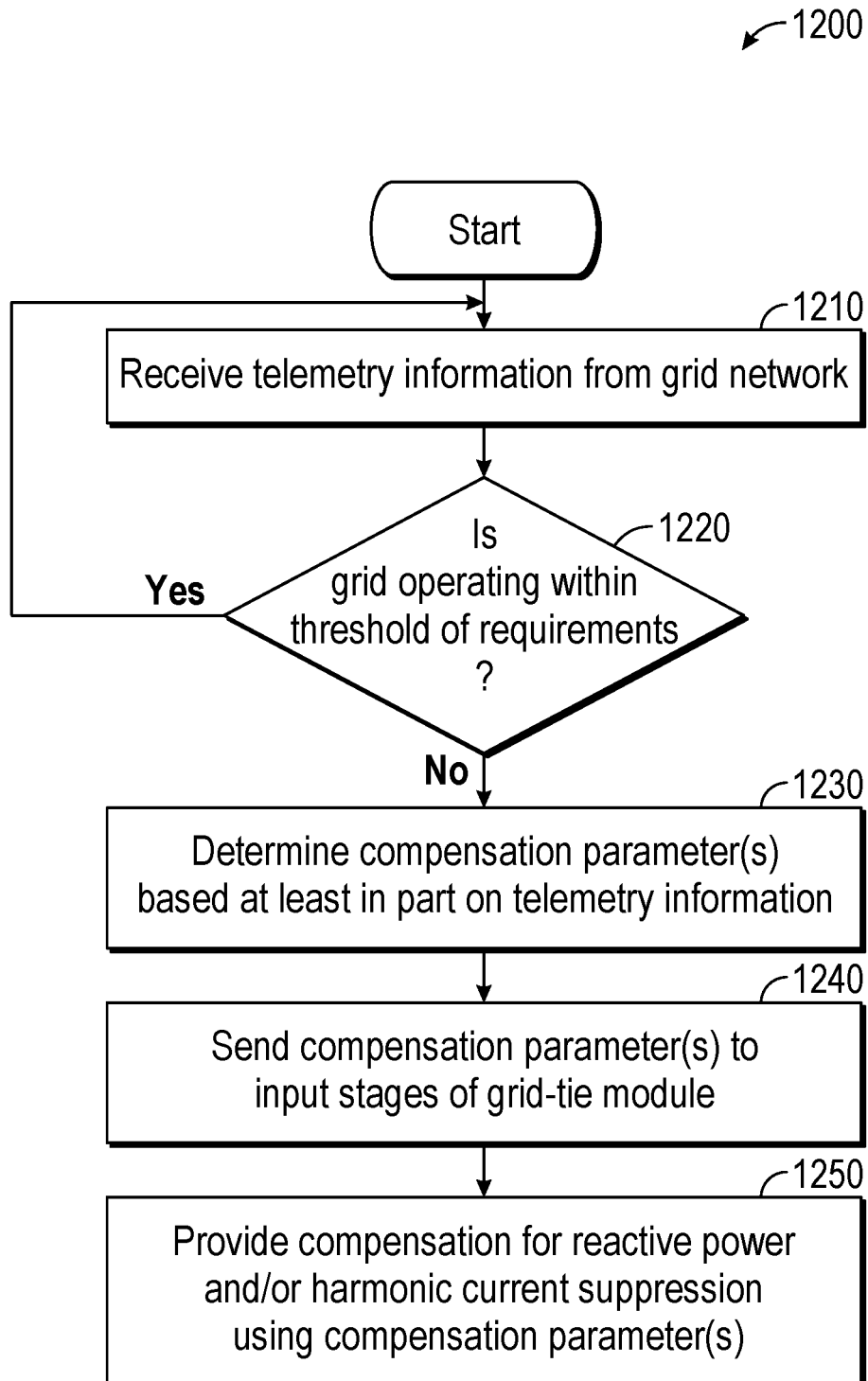
FIG. 12 is a flow diagram of a method in accordance with yet another embodiment.

Referring now to FIG. 12, shown is a flow diagram of a method in accordance with yet another embodiment. As shown in FIG. 12, method 1200 is a method for providing compensation to a distribution grid network via an EV charging system. As such, method 1200 may be performed by an EV charging system such as any of those described above. In part, method 1200 may be executed using instructions stored in one or more non-transitory storage media such as may be executed by any form of controller (such as described in FIGS. 1A and 8, for example).

As shown, method 1200 begins by receiving telemetry information from a grid network (block 1210). Next it is determined at diamond 1220 whether the grid is operating within at least a threshold of various requirements. Although embodiments are not limited in this regard, such requirements may include reactive power requirements, voltage sag requirements or so forth. If the grid is determined not to be operating within a threshold, control passes to block 1230. At block 1230, compensation parameters may be determined. More specifically, a controller may determine one or more compensation parameters based at least in part on the telemetry information. These compensation parameters may include, for example, a reactive power compensation percentage of total kiloVolt Ampere (kVA), or so forth.

Still in reference to FIG. 12, next control passes to block 1240 where these one or more compensation parameters may be provided to the input stages of a grid-tie module of the EV charging system. Note that these compensation parameters may be used to control switching devices within the grid-tie module. As such, by such configuring/re-configuring of various devices within the grid-tie module, at block 1250 the system may provide compensation for reactive power and/or harmonic current compression using the one or more compensation parameters. Understand while shown at this high level in the embodiment of FIG. 12, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An electric vehicle (EV) charging system comprising:
a plurality of first converters to receive grid power at a distribution grid voltage and convert the distribution grid voltage to at least one second voltage;
at least one high frequency transformer coupled to the plurality of first converters to receive the at least one second voltage and to output at least one high frequency AC voltage; and
a plurality of second converters coupled to an output of the at least one high frequency transformer, each of the plurality of second converters comprising a unidirectional AC-DC converter to receive the at least one high frequency AC voltage and convert the at least one high frequency AC voltage to a DC voltage, wherein at least some of the plurality of second converters are cascaded to provide a DC charging voltage as a charging current or a charging voltage at a pair of output nodes.

2. The EV charging system of claim 1, wherein the unidirectional AC-DC converter comprises a secondary side comprising a plurality of passive devices.

3. The EV charging system of claim 2, wherein the plurality of passive devices comprises a plurality of diodes.

4. The EV charging system of claim 3, wherein the plurality of diodes comprises:
a first pair of diodes coupled between the pair of output nodes; and
a second pair of diodes coupled between the pair of output nodes, wherein the second pair of diodes are coupled in parallel with the first pair of diodes.

5. The EV charging system of claim 4, further comprising a capacitor coupled between the pair of output nodes.

6. The EV charging system of claim 1, further comprising a cabinet comprising the plurality of first converters, the at least one high frequency transformer, and the plurality of second converters.

7. The EV charging system of claim 6, further comprising at least one dispenser integrated with the cabinet.

8. The EV charging system of claim 7, wherein the at least one dispenser comprises a plurality of dispensers.

9. The EV charging system of claim 1, wherein the at least one transformer comprises a single transformer having a plurality of primary windings, each of the plurality of primary windings coupled to one of the plurality of first converters and a plurality of secondary windings, each of the plurality of secondary windings coupled to one of the plurality of second converters.

10. The EV charging system of claim 1, wherein:
a first set of the plurality of second converters are cascaded to provide a first DC charging voltage at a first pair of output nodes coupled to a first dispenser; and
a second set of the plurality of second converters are cascaded to provide a second DC charging voltage at a second pair of output nodes coupled to a second dispenser.

11. The EV charging system of claim 10, wherein a number of the first set of the plurality of second converters is greater than a number of the second set of the plurality of second converters.

12. The EV charging system of claim 1, further comprising a controller to control the EV charging system to:
provide the DC charging voltage as the charging voltage to a first EV based at least in part on first status information of the first EV; and
provide the DC charging voltage as the charging current to the first EV based at least in part on second status information of the first EV.

13. A method comprising:
receiving, in a controller of an electric vehicle (EV) charging system, first status information of at least one EV coupled to the EV charging system, wherein the EV charging system comprises:
a plurality of first converters to receive grid power from a distribution network;
a high frequency transformer coupled to the plurality of first converters; and
a plurality of unidirectional rectifiers coupled to the high frequency transformer;
based on a charge level of the first status information, controlling the EV charging system to provide a charging current to the at least one EV;
receiving, in the controller, second status information of the at least one EV; and based on a charge level of the second status information, controlling the EV charging system to provide a charging voltage to the at least one EV.

14. The method of claim 13, further comprising:
directly receiving the grid power from the distribution network at the plurality of first converters, the grid power at a medium voltage level and at a low frequency;
converting the medium voltage level to a high frequency AC voltage; and
providing the high frequency AC voltage to the high frequency transformer.

15. The method of claim 14, further comprising:
providing a second high frequency AC voltage from the high frequency transformer to the plurality of unidirectional rectifiers;
converting the second high frequency AC voltage to a DC voltage; and
outputting the DC voltage from one or more of the plurality of unidirectional rectifiers to at least one dispenser to provide the charging current or the charging voltage to the at least one EV.

16. An electric vehicle (EV) charging system comprising:
a grid-tie module to directly couple to a distribution grid network at a grid connection and convert a grid voltage to a plurality of first high frequency AC voltages;
a single high frequency transformer having a plurality of primary windings coupled to the grid-tie module to receive the plurality of first high frequency AC voltages and a plurality of secondary windings to output a plurality of second high frequency AC voltages; and
a plurality of unidirectional rectifiers, each coupled to one of the plurality of secondary windings to receive one of the plurality of second high frequency AC voltages and provide a DC voltage to at least one EV charging dispenser.

17. The EV charging system of claim 16, wherein the DC voltage provided from each of the plurality of unidirectional rectifiers is galvanically isolated from the DC voltage provided from others of the plurality of unidirectional rectifiers.

18. The EV charging system of claim 16, wherein each of the plurality of unidirectional rectifiers comprises an AC-DC converter having a secondary side comprising a plurality of passive devices.

19. The EV charging system of claim 16, further comprising a controller to couple at least a first set of the plurality of unidirectional rectifiers in series to provide the DC voltage comprising a charging voltage.

20. The EV charging system of claim 16, further comprising a controller to couple at least a second set of the plurality of unidirectional rectifiers in parallel to provide the DC voltage comprising a charging current.

* * * * *